United States Patent [19]

Schneider

[11] Patent Number: 4,722,262
[45] Date of Patent: Feb. 2, 1988

[54] FLUID PRESSURE SYSTEM AND VALUE THEREFOR

[75] Inventor: Walter Schneider, Neugablonz, Fed. Rep. of Germany

[73] Assignee: Massey-Ferguson Services N.V., Curacao, Netherlands Antilles

[21] Appl. No.: 691,968
[22] PCT Filed: May 12, 1984
[86] PCT No.: PCT/EP84/00142
 § 371 Date: Jan. 14, 1985
 § 102(e) Date: Jan. 14, 1985
[87] PCT Pub. No.: WO84/04786
 PCT Pub. Date: Dec. 6, 1984

[30] Foreign Application Priority Data

May 21, 1983 [DE] Fed. Rep. of Germany ....... 3318618
Jan. 27, 1984 [DE] Fed. Rep. of Germany ....... 3402237

[51] Int. Cl.[4] .............................................. F15B 11/08
[52] U.S. Cl. ......................................... 91/447; 91/468
[58] Field of Search .................. 91/356, 462, 468, 447

[56] References Cited

U.S. PATENT DOCUMENTS 4,206,685 6/1980 Pusch ..................................... 91/356

FOREIGN PATENT DOCUMENTS 0067286 12/1982 European Pat. Off. .
7812497 6/1979 Netherlands ........................... 91/462
1502620 3/1978 United Kingdom .

Primary Examiner—Edward K. Look

[57] ABSTRACT

A fluid pressure system incorporating a piston and cylinder actuator which is initially moved from right to left and is reversed at the left hand end of its stroke by a switching valve upon receiving a signal through a passage from a sensing valve which becomes hydraulically balanced during a no-flow condition of the system and is displaceable to a switch initiating state during that condition by a small force originating from a light spring, or the actuator or from the operation of another valve in the system.

15 Claims, 8 Drawing Figures

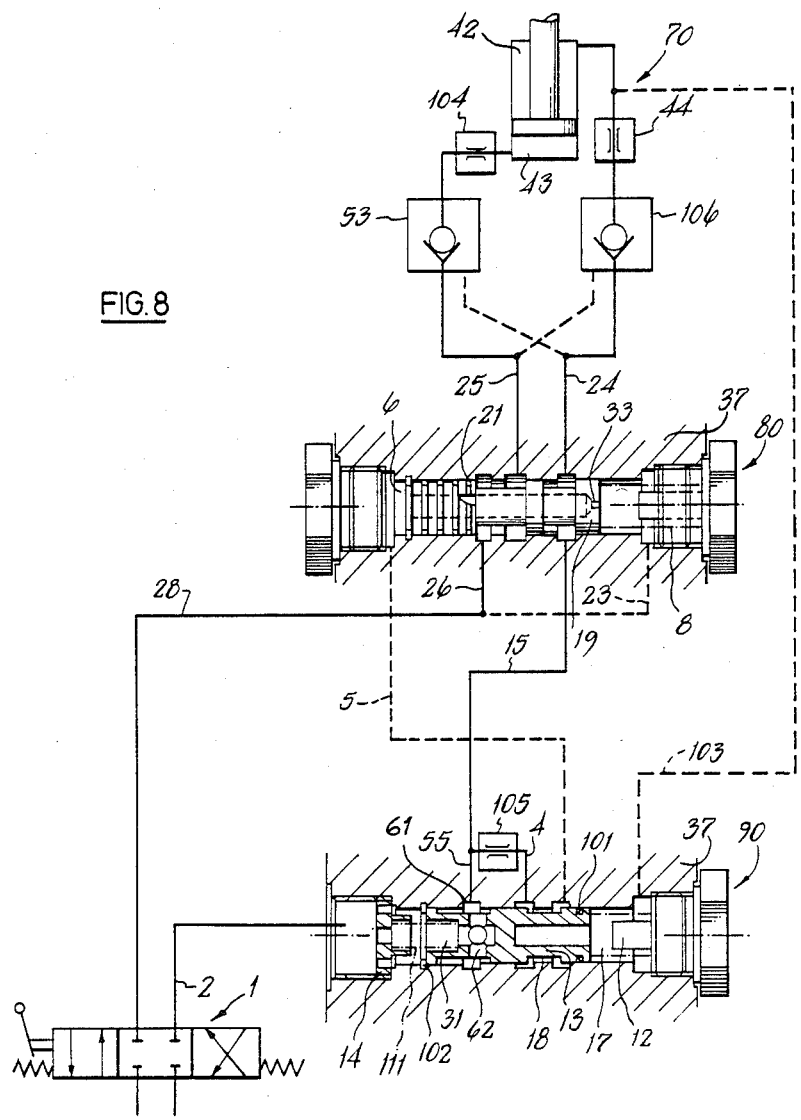

FLUID PRESSURE SYSTEM AND VALUE THEREFOR

The invention relates to a fluid pressure system and hydraulic valves for automatically redirecting flow of pressure fluid from one side of the hydraulic motor, such as the hydraulic cylinder to the other for the purpose of reversing the hydraulic motor.

The invention provides for a signal reversal of the motor during one cycle of its operation without having to operate manually the normal main control valve for the actuator.

The currently known automatic valves of this type effect the redirection of flow either directly by means of mechanical or electric mechanical stops or triggers moved by the end of stroke movement of the piston or indirectly by means of pressure sensitive elements which switch over the reversing valve in response to predetermined pressure drops. The mechanical stops or triggers have the disadvantage in certain applications and particularly when used on turn-over plough mechanisms that they must be accurately designed, manufactured and adjusted and if used in a hard working environment must be readjusted because of the wear and deformations of individual parts. Furthermore they require extra space for installation and are of relatively high cost because a relatively larger number of parts are required.

A major disadvantage of indirect switching systems which rely on pressure is that because the turn-over plough or other mechanism may be carried by one of many makes of agricultural tractor the system pressure available from the tractor may vary considerably both between makes of tractor and between models of the same make, consequently the pressure at which the automatic valve on the plough operates must either be adjusted to match the tractor or it must be adjusted to respond to the lowest of all the tractor system pressures available. In the latter case the plough may be carrying a hydraulic cylinder which is far too large and expensive for a tractor which can supply a higher system pressure. The further disadvantage of indirect systems which rely on large pressure drops is that the actuator may reach the geometric end of its stroke before or after the pressure has built up to the pre-determined pressure differential so that the transition to the second part of the cycle is accompanied by a shock. Yet a further disadvantage of the system which rely on pressure and which are protected by a "kick-out" type of main control valve is that the pump delivery volume may also be high and internal throttling gives rise to a high dynamic or transient pressure during or at the end of the cylinder movement so that the tractor driver has to operate the main control valve lever a second time or keep his hand on it until the cycle is complete.

The objective of the invention is to mitigate the foregoing disadvantages and provide an automatic reversing valve which operates at the correct geometric position and which achieves a smooth transition with minimal delay and is independent of both the pressure of the system to which it is connected and the volume of delivery of the system pump.

According to the present invention there is provided a fluid pressure motor and fluid pressure valve means connected to said motor wherein the valve means includes a switching means for redirecting flow of pressure fluid to the motor and sensing means responsive to a predetermined state of the system and adapted to cause said switching means to operate.

Preferaby the sensing means is constituted by a sensing valve capable of taking up a stable operating position or a switch initiating position and adapted to become hydraulically balanced and on becoming so balanced of moving from the stable operating position to the switch initiating position and the application of a small force thereto.

The sensing valve preferably becomes balanced when the flow to the motor is zero and the small force may be derived from a spring or hydraulically from the motor itself or another part of the system.

According also to the present invention there is provided fluid pressure valve means adatped to be connected to a fluid pressure motor, and incorporating sensing means for detecting the absence of flow of pressure fluid there through, switching means of providing an additional or alternative path for the pressure fluid and signalling means responsive the said sensing means for energising said switching means.

Preferably the sensing means is constituted by a sensing valve, the switching means is constituted by a switching valve and the signalling means is constituted by a pressure fluid signalling connection between the two. The sensing valve may comprise a spool adapted to be connected at one end to a supply source, adapted at the other end to be connected to said motor and adapted to take up a stable position when there is flow towards the motor and adapted to become displaceable momentarily to a switch-initiating position when flow to said motor becomes zero and a small hydraulic pressure is received preferably from the motor.

Accordingly, further to the invention a fluid pressure system includes at least one fluid pressure motor and pressure valve means connected to the motor characterised in that the valve means is capable of detecing zero flow to said motor and in consequence reversing the flow of pressure medium there-to. The fluid pressure motor may be the double acting hydraulic actuator of a turnover plough.

Exemplary embodiment of the present invention will now be described with reference to the accompanying drawings of which;

FIG. 8 shows a further practical hydraulic system and sensing valve.

Figure 1:
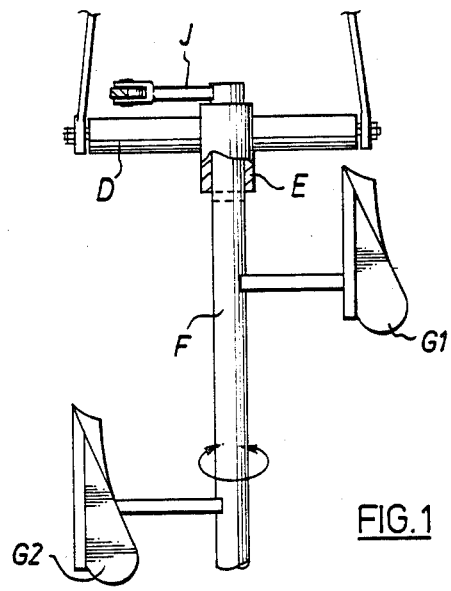
FIG. 1 is a plan view of a turnover plough shown schematically and known of itself to which the invention can be applied.
Figure 2:
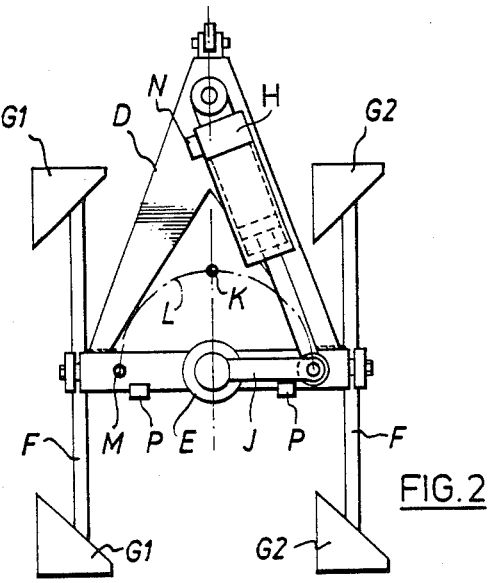
FIG. 2 is a front elevation of the turnover plough of FIG. 1 to illustrate the kinematics of its movement.

In FIGS. 1 and 2 the turnover plough consists of a headstock D adapted to be supported on three point links of an agricultural tractor in known manner. The headstock D carries a trunnion E for mounting a rotatable frame F on which are mounted one or more pairs of plough bodies G1, G2, etc.

One plough body is adapted to make a right-hand furrow and the other a left-hand one. The headstock D also pivotally supports at its upper part the end of the cylinder of a hydraulic double-acting piston and cylinder actuator H whilst the piston rod end is pivotted on the end of a crank arm J fixed to the frame F. It will be seen that the pressurisation of the rod chamber of the actuator H will cause rotation of the frame F through 90 degrees or half a cycle to the dead centre position represented by the point K of the locus L of the piston rod end. Inertia of the frame F and bodies G1, G2, etc., will carry it beyond 90 degrees and if the piston head chamber of the cylinder is now pressurised as well as the rod chamber, the differential area exposed to pressure will extend the actuator and bring the frame F and bodies G1, G2, etc., to the position represented by point M on locus L. Alternatively, the head chamber alone may be pressurised in which case the second part of the cycle will be performed more slowly than the first. The valve N, being a principal subject of the present invention may be conveniently mounted on the actuator H or the nearby headstock in position to receive a supply of pressure fluid, preferably hydraulic oil, from the agricultural tractor on which the plough is mounted. The actuator H is not shown in FIG. 1 for the sake of clarity.

Figure 3:
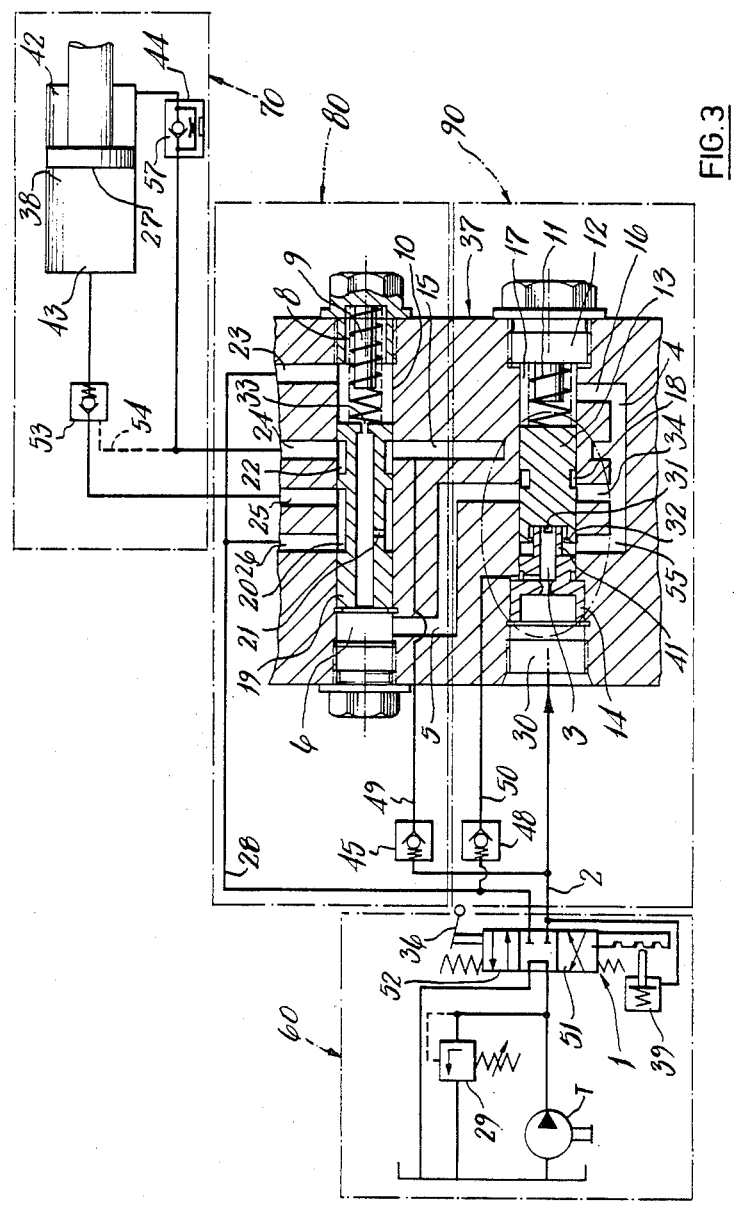
FIG. 3 represents a diagrammatic illustration of a valve and hydraulic motor according to the invention.

Referring to FIG. 3 and subsequent figures, and to facilitate understanding, several areas of the drawing are enclosed by chain dotted rectangles. Area 60 represents part of the hydraulics of the tractor. Area 70 generally defines the actuator already referred to as H. Area 80 generally defines a switching valve through which the hydraulic oil flows. Area 90 generally defines a sensing valve. Hydraulic oil is used as the pressure fluid but gaseous medium could be used. The switching valve 80 and sensing valve 90 are in this embodiment incorporated in a common housing 37 which is connected externally to tractor hydraulic 60 and actuator 70. Area 60 generally includes a pump T, a pressure relief valve 29 and a main control valve 1 which is manually operable by lever 36 and is spring loaded to centre. The control valve may also have a hydraulically releasable detent device 39 known a a "kick-out" which is released upon application of system pressure and which holds the valve 1 in one of its active positions until it is kicked out.

When manual control valve 1 is manually actuated to the mode shown by panel 52, a feed flow is produced in pipe 2 and chamber 30 and is lead on through an orifice 35 and a passage 3 in a nozzle body 14 which is retained immovably in the housing 37. A spool 13 of sensing valve 90 fluid tightly slidable in the housing 37 has at its left hand end as seen best in FIG. 4 a chamber to be known as a feed flow chamber 56. A nose portion 41 of nozzle 40 enters into this chamber and a lip 32 closely encircles and forms a main throttle for oil flowing out of feed flow chamber 56. This main throttle is of uniform size irrespective of the relative position of the portion 41 with respect to the lip 32. The spool valve 13 is permitted to move to the right to abut a stop 12 which is positioned so that lip 32 always encircles the portion 41 throughout their relative travel.

Flow out the flow chamber 56 through the main throttle is termed the exit flow and passes into gallery 55 which connects with port 34 of sensing valve 90, and with passage 15 and with exit flow chamber 17 at the right hand end of spool 13. A light spring 11 is placed in this chamber to bias the spool 13 constantly towards the left. Port 34 is placed almost opposite signal passage 5 in position so that annular groove 18 on spool 13 does not connect them when the spool is against stop 12 but progressively does so as the spool moves to the left.

The switching valve 80 consists of a spool 19 slidable in the housing 37 and having switching chamber 6 at the left hand end as seen in FIG. 3 and an exhaust chamber 10 at the right hand end. A spring 8 in the exhaust chamber 10 constantly biases the spool 19 towards the left hand end of its travel whilst a stop 9 is adapted to limit the rightward travel. Signal passage 5 is in permanent communication with switching chambers 6 and exhaust chamber 10 is permanently connected to the hydraulic drain line 28.

Passage 15 is a pressure feed port for the switching valve 80 and in the position shown in FIG. 3 annular control groove 22 on spool 19 connects it to passage 24 which leads to actuator 70. A second control groove 20 on spool 19 is adapted to bridge drain passage 26 and passage 25 which also leads to the actuator 70 as shown in FIG. 3. When the spool 19 abuts stop 9, control groove 22 is non-operational and control groove 20 bridges passages 24 and 25 and passage 15.

Hydraulic actuator 70 is a double acting piston/cylinder motor 38 in which a piston rod chamber 42 and a head chamber 43 are separated by a piston 27. A throttle 44 and check valve 57 are placed in parallel in passage 24 leading to the rod chamber 42 and a pressure releasable check valve 53 is placed in the passage 22 leading to the head chamber 43. A signal line 54 joins passage 24 and check valve 53 so that the check valve can be opened when passage 24 is pressurised.

In operation the feed flow release by the manual valve 1 enters feed chamber 56 and by virtue of the main throttle forces the spool onto the stop 12. Flow passing through the main throttle passes into gallery 55 still at high pressure and passes successively through passage 15, groove 22, passage 24 and check valve 57 to rod chamber 42 where it moves the frame F towards the dead centre point K in FIG. 2. Pressurising line 24 opens valve 53 and permits head chamber 43 to vent through passages 25, control groove 20, and drain lines 26 and 28. As the dead centre point K is approached, the flow reduces until it reaches zero when the pressure in the feed chamber 56 and the exit flow chamber 17 will be equal and at the system pressure and the spring 11 will push the spool 13 to its leftward limit which will connect port 34 through control groove 18 with signal passage 5 and provide system pressure in switching chamber 6. Such a pressure moves spool 19 rightwards to stop 9 in which position pressure from passage 15 is delivered to passages 24 and 25. Pressure flow passes through line 25 and check valve 53 into head chamber 43 and by virtue of acting on the differential area of the piston 27 displaces the latter so that the frame F now moves towards point M on the locus L. As soon as flow starts up again, the spool 13 is displaced on to stop 12 and the signal passage 5 is cut off. Should the pressure in switching chamber 6 decay to zero the spring 8 would move the spool 19 to the right. In order to prevent this from happening a small orifice 21 connecting groove 20 with chamber 6 is provided to keep the latter topped up with pressure, it being understood that groove 20 is pressurised by passage 15 in the rightward position.

When the frame F reaches point M on the locus L it abuts against an external stop P, see FIG. 2, and the piston 27 at this point is near the outward end of its stroke. At this point the sensing spool will move to the left again but the spool 19 will remain at the rightward end of its travel and the frame will remain at M, i.e., the cycle will be complete. The main valve 1 may now be restored by hand to the neutral position where-upon flow will be stopped and check valve 53 will operate to keep fluid locked into head chamber so keeping the frame F against the stop P. Also, spool 13 and spool 19 will move to the left end of their travel ready to repeat the cycle in the opposite direction of movement of the frame along locus L when the manual control lever 1 is again operated to the mode shown in panel 52.

If the manual control lever 1 is operated to the mode shown in panel 51, the head chamber 43 is pressurised directly through line 28, groove 20, passage 25 and check valve 53. Also the exhaust chamber 10 will become pressurised and spool 19 will be moved to the left. The rod chamber 42 will vent through throttle 44, passage 24, groove 22, passage 15, line 49 through check valve 45 to drain. When the frame F reaches the dead centre point K on the locus L no switching will take place and the frame will be held by pressure in this position. Conveniently this may be in the transport position giving a good ground clearance so that the valve 60 used in the mode provided by panel 51 offers this further advantage.

A further feature adapted to avoid premature operation of the kick-out is the provision of a throttle 46 leading through line 50 and a check valve 48 to drain. This throttle 46 functions to smooth any pressure peaks which might operate the kick-out at the wrong moment. This throttle 46 does not prevent genuine operation of the kick-out when a steady state high pressure in the system is reached. Two anti-vibration throttles are provided, namely groove 31 in the nose portion 41 for preventing vibration of spool 13 and damping orifice 33 in the end of spool 19 for the same purpose.

Figure 4:
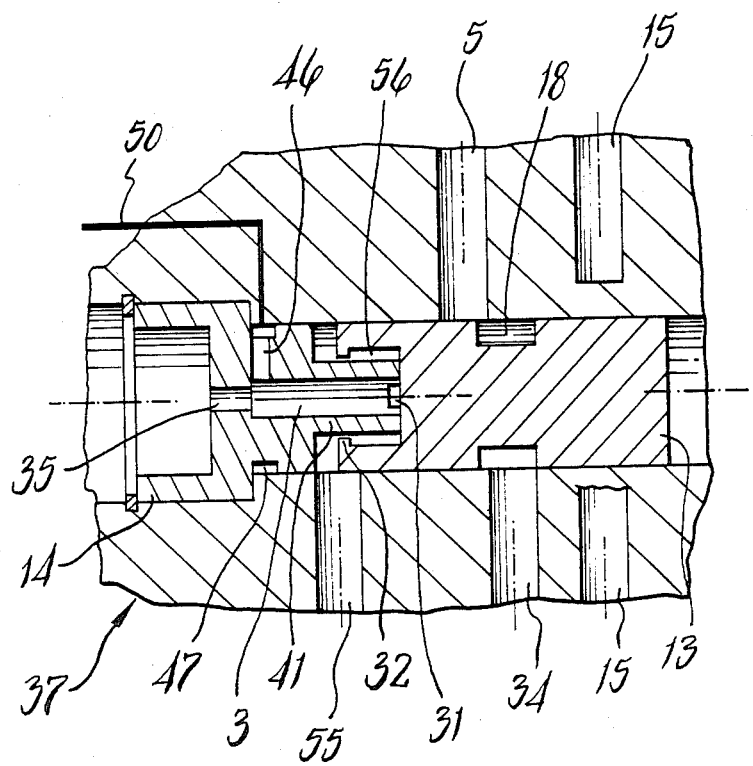
FIG. 4 is an enlargement of a portion of FIG. 3.
Figure 5:
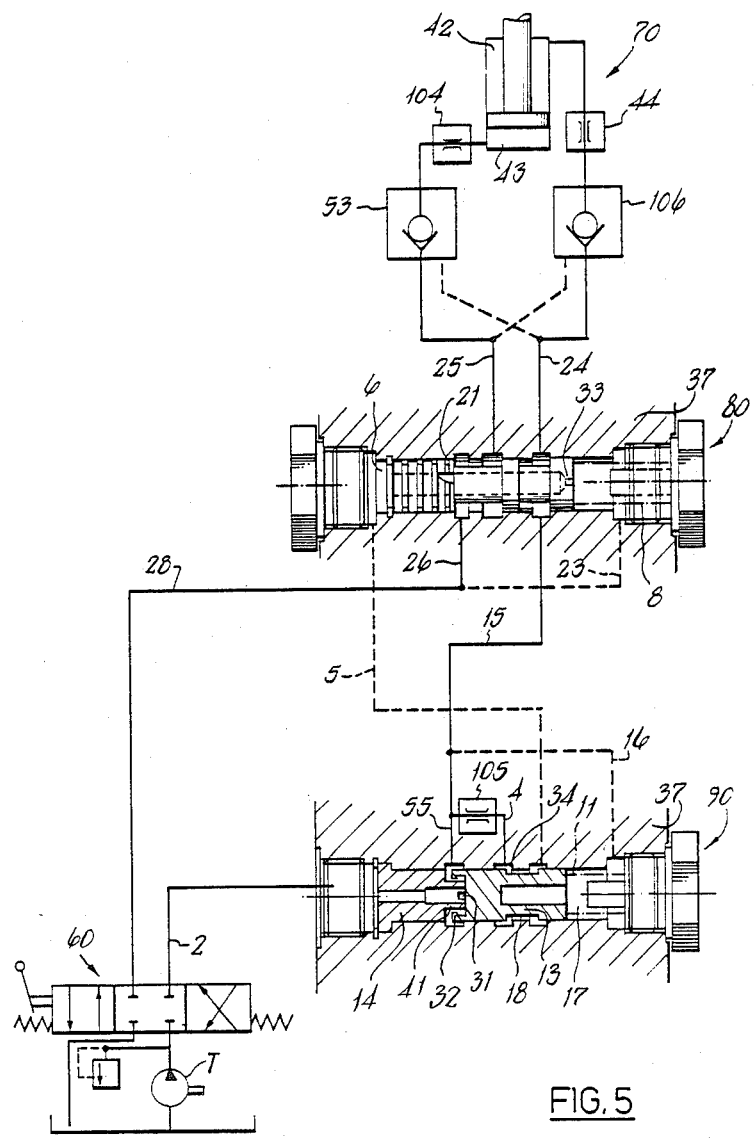
FIG. 5 is an abreviated diagramatic illustration similar to FIG. 3.

FIG. 5 shows a system which operates in principal as described above. Differences between this and the system according to FIGS. 3 and 4 are as follows. The check valve 106 is placed in series with throttle 44 in actuator 17 as compared with a parallel relationship of check valve 57 and throttle 44, FIG. 3. Check valve 106 is released by pressure applied to passage 25. The advantage of this arrangement applies when a large and-/or external force is exerted on the piston rod tending to extend the actuator 70 and control derived from the pressure passages 24 or 25 is desirable. The pilot release check valve 53 and 106 would probably have different characteristics if uniform turning speed of the frame F is required. The throttle 104 to complement throttle 44 prevents too rapid a retraction of the actuator 17. It will be appreciated that the line 16 to chamber 17 corresponds to gallery 55 FIG. 1 and that lines 15 and 16 are always at exit flow pressure. A throttle 105 is provided to smooth out any pressure variations in the signal pressure which is passed from the exit flow gallery 55 through port 34, groove 18 and signal passage 5 to switching chamber 6. Also in this embodiment the topping-up orifice 21 for maintaining low pressure in switching chamber 6 is now marked by the housing 37 when the spool 19 is in the leftward position to prevent pressure perturbations arising from the venting of the head chamber 43 from effecting the switching chamber 6.

Figure 6:
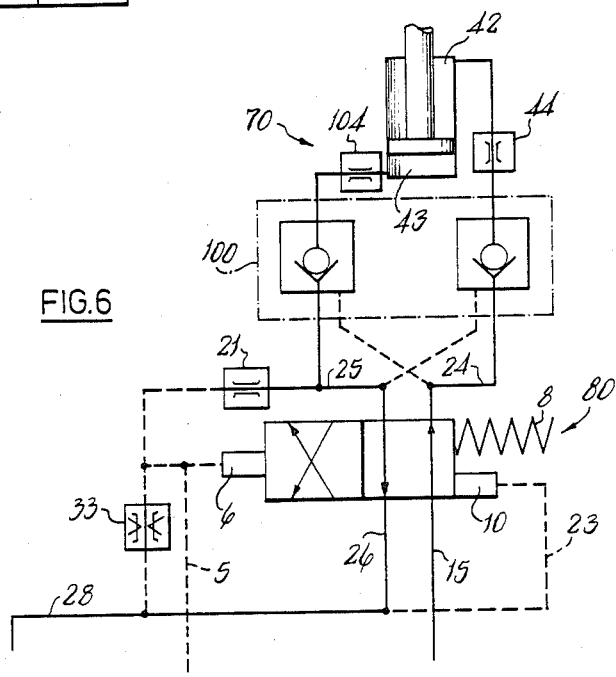
FIG. 6 is similar to FIG. 5 and shows a variation of the switching valve.

FIG. 6 illustrates an alternative switching valve and piping arrangement for actuator 70. In this case a four port - two position valve is used to pressurise the rod chamber 42 initially and the head chamber 43 during the second part of the cycle. This means that the speed of movement from dead-centre point K to the end point M on the locus will be slower than formerly but the forces applied during this second part of the cycle will be larger. In this embodiment switching chamber 6 is represented diagrammatically as is exhaust chamber 10 and a simplified combined cross over check valve block 100 in which the two check valves have the same characteristics can be used. The topping-up orifice 21 and the damping orifice 33 are represented digrammatically also. The switching operation of this system is no different from those previously described, that is to say switching only takes place at or near the dead-centre point K.

Figure 7:
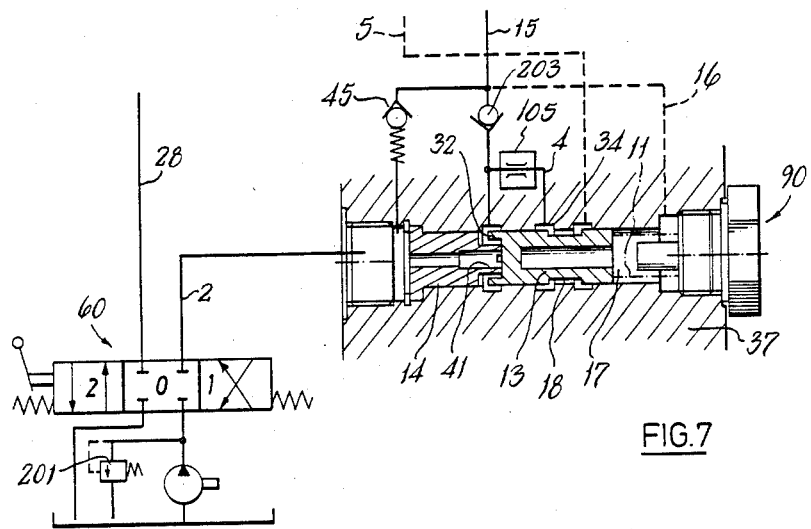
FIG. 7 shows another version of the sensing valve which can be used.

FIG. 7 illustrates a version of the sensing valve 90 which senses when the flow is zero as a result of using a form of pressure relief valve 201 which after it has relieved the system pressure generates a low pressure wave. Hence when the actuator 70 reaches the position corresponding to the dead centre point K, the system pressure relief valve operates and generates low pressure in the feed chamber 56. This allows the residual pressure in the exit flow chamber 17 alone or together with the spring 11 to move the spool 13 to the left and initiate switching as before. It will be appreciated that during the time taken to build up to relief pressure the frame, having considerable rotary inertia may go beyond the dead centre position A and start displaced fluid back through passages 15 towards gallery 55 where it would interfere with the low pressure wave, hence check valve 203 is placed in line 15 to prevent this. The Figure 7 embodiment is to illustrate that the zero flow condition need only be momentary for the switching to take place.

FIG. 8 illustrates an important practical version of the invention in which the spool 13 does not have a feed chamber 56 but is cross drilled into groove 61 which communicates with gallery 55. The nozzle 14 does not have a nose and acts to hold one end of light coiled compression spring 111 the other end of which is located against the end of spool 13. The right hand end of spool 13 is provided with a seal 101 and chamber 17 is connected directly with chamber 42 of the actuator 70 by line 103. In operation in the stable position spool 13 rests against stop 12 by the action of spring 111 and the feed pressure which is transmitted through the cross drillings 62 and groove 61 to gallery 55 and through passage 15 to chamber 42 and from there via line 103 to the chamber 17. When the frame reaches the dead-centre point K the flow stops resulting in a hydraulic balance of spool 13. Due to inertia of the frame F and plough bodies G1 and G2 the plough continues its motion and the actuator momentarily becomes a pump which additionally pressurises a line 103 and chamber 17 sufficiently to overcome the light bias of spring 111 and displace spool 13 to the left as shown in FIG. 8. In this position system pressure is transmitted via port 4 and control groove 18 to signal passage 5 and switching chamber 6 where spool 19 redirects pressure fluid to head chamber 43 as previously described, and piston chamber 42 to drain. The pressure in chamber 17 and line 103 decays rapidly and spool 13 immediately reassumes its stable position abutting stop 12.

Other improvements to the hydraulic circuits may be made for the purpose of eliminating pressure variations and unwanted signals or flows without detracting from the invention.

One type of actuator has been described as being used in two ways in the above description. However, there could be multiple actuators of various kinds arranged in parallel. Alternatively, it could be arranged that if having regard to the kinematics of the ways in which a bank of one or more actuators are mounted, a zero flow occurs at the sensing valve 19 this signal could be used not only to condition the further movement of the existing bank of actuators but additionally or alternatively to condition the movment of a further bank of one or more actuators.

I claim:

1. A fluid pressure system including at least one fluid pressure motor and fluid pressure valve means connected thereto wherein said valve means includes a switching means for redirecting flow of pressure fluid to the motor and sensing means constituted by a sensing valve capable of taking up a stable operating position or a switch initiating position characterised in that said sensing valve becomes hydraulically balanced when the flow therethrough is zero and is displaceable to a switch initiating position on application of a small force thereto.

2. A fluid pressure system as claimed in claim 1 characterized in that said small force is applied momentarily and lasts only long enough for switching to be completed whereupon said sensing valve reassumes its stable position.

3. A fluid pressure system as claimed in claim 1 characterized in that said small force is derived from a mechanical energy store such as a spring.

4. A fluid pressure system as claimed in claim 1 characterized in that said small force is derived hydraulically from the operation of the said motor as a pump.

5. A fluid pressure system as claimed in claim 1 characterized in that said small force is derived hydraulically from the operation of a pressure relief valve in the form of a transient hydraulic wave originating therefrom.

6. A fluid pressure system as claimed in claim 1 characterized in that the fluid pressure motor comprises the hydraulic actuator of a turn-over plough.

7. For use in a fluid pressure system containing a fluid pressure motor and connected thereto fluid pressure valve means incorporating a sensing valve, a switching valve and a pressure fluid signalling connection therebetween characterized in that said sensing valve, during operation, is adapted to become hydraulically balanced when there is no flow through the sensing valve, and to receive a bias from within the fluid pressure system and on moving to a switch initiating position, in response to said bias, to cause, through said signalling connection, said switching valve to operate.

8. Valve means as claimed in claim 7 characterized in that said sensing valve comprises a spool constituting together with a stationary element on the valve body a main throttle separating the flow of pressure fluid into feed flow and exit flow, said spool being adapted to be biased in one direction by said feed flow and in the other direction by exit flow and opposite biasing means together, the arrangement being that when flow through the sensing valve ceases said opposite biasing means is operative to move the spool against the flow and permit pressure to be transferred as a signal through said signalling connection to said switching valve.

9. Valve means as claimed in claim 8 characterized in that said opposite biasing means is constituted by a spring.

10. Valve means according to claim 8 characterized in that said opposite biasing means is constituted by a transient depression means adapted to create a lowering of the feed flow pressure.

11. Valve means as claimed in claim 10 characerized in that said transient depression means is constituted by pressure relief valve which in operation causes a wave to travel along the direction of feed flow so that at the said main throttle the feed flow pressure becomes zero or even negative for a brief time.

12. Valve means a claimed in claim 7 characterized in that said sensing valve comprises a spool adapted to be connected at one end to a supply source, adapted at the other end to be connected to said motor and adapted to take up a stable position when there is flow towards said motor and adapted to become displaceable momentarily to a switch-initiating position when flow to said motor becomes zero and a small hydraulic pressure increase is received.

13. Valve means as claimed in claim 12 characterized in that said small hydraulic pressure increase is derived from said hydraulic motor acting as a pump.

14. Valve means as claimed in claim 7 characterized in that said switching valve is constituted by a switching spool adapted to connect, before switching, the flow of pressure fluid to one chamber of hydraulic motor means, and to connect, after switching, the flow of pressure fluid to a second chamber of the hydraulic motor means.

15. Valve means as claimed in claim 7 characterized in that the switching valve is adapted to connect, after switching, flow of pressure fluid to both chambers of said hydraulic motor means.

* * * * *